(12) United States Patent
Joo

(10) Patent No.: US 6,687,871 B2
(45) Date of Patent: Feb. 3, 2004

(54) DIGITAL SIGNAL PROCESSING APPARATUS FOR REPRODUCING OPTICAL DISC DATA AND OPTICAL DISC PLAYER HAVING THE SAME

(75) Inventor: Tae-shik Joo, Yongin (KR)

(73) Assignee: Samsung Electronics Co., Ltd. (KR)

(*) Notice: Subject to any disclaimer, the term of this patent is extended or adjusted under 35 U.S.C. 154(b) by 434 days.

(21) Appl. No.: 09/845,698

(22) Filed: Apr. 30, 2001

(65) Prior Publication Data
US 2001/0054169 A1 Dec. 20, 2001

(30) Foreign Application Priority Data
Jun. 16, 2000 (KR) ......................................... 2000-33233
Aug. 23, 2000 (KR) ......................................... 2000-48994

(51) Int. Cl.[7] .............................................. G11C 29/00
(52) U.S. Cl. ....................................... 714/769; 714/799
(58) Field of Search ................................ 714/769, 746, 714/799; 369/13.56

(56) References Cited

U.S. PATENT DOCUMENTS 5,216,677 A * 6/1993 Takagi et al.
5,581,715 A * 12/1996 Verinsky et al.

* cited by examiner

Primary Examiner—Phung M. Chung
(74) Attorney, Agent, or Firm—F. Chau & Associates LLC

(57) ABSTRACT

A digital signal processing method and apparatus that provide a mechanism for controlling the output of digitally processed data in an optical disc player so as to reduce the probability of error and lost data during such output. In one aspect, an apparatus for processing information on an optical disc comprises a signal processor for processing a digital signal corresponding to an analog signal read from the optical disc to generate output data, a memory unit, operatively associated with the signal processor, for temporarily storing the output data in predetermined units under the control of the signal processor, and an output unit, operatively connected to the signal processor, for processing the output data based on the type of optical disc. The output unit generates a request signal that causes the signal processor to retrieve output data from the memory unit and transmit the retrieved output data to the output unit in parallel. The signal processor activates an acknowledge signal such that output data transmitted to the output unit while the acknowledge signal is activated is deemed valid by the output unit, whereas output data that is transmitted while the acknowledge signal is deasserted is deemed invalid.

16 Claims, 6 Drawing Sheets

FIG. 8

MODE 1 (153.6 kbytes/s)

| SYNC | HEADER | | | | USER DATA | AUXILIARY DATA | | | |
|---|---|---|---|---|---|---|---|---|---|
| | BLOCK ADDRESS | | | MODE 1 | | EDC | SPACE | ECC | |
| | MIN | SEC | BLOCK | | | | | P PARITY | Q PARITY |

MODE 2 (175.2 kbytes/s)

| SYNC | HEADER | | | | ALL USER DATA |
|---|---|---|---|---|---|
| | BLOCK ADDRESS | | | MODE 2 | |
| | MIN | SEC | BLOCK | | |

DIGITAL SIGNAL PROCESSING APPARATUS FOR REPRODUCING OPTICAL DISC DATA AND OPTICAL DISC PLAYER HAVING THE SAME

BACKGROUND

1. Technical Field

The present invention relates generally to an optical disc player for reproducing signals recorded on an optical disc and, more particularly, to a digital signal processing apparatus and method for reproducing digital signals read from an optical disc regardless of the type of disc and providing a mechanism for controlling the output of the reproduced digital signals.

2. Description of the Related Art

A compact disc (CD), which is a type of optical disc, is a storage medium that can store a large amount of information. An audio disc stores stereo audio signals that are generated from two 16-bit data words sampled at 44.1 MHz. Audio data is typically output from an audio disc player at the rate of $1.41 \times 10^6$ bits/sec. Data for error-correction, synchronization and modulation are also necessary for reproducing signals recorded on an optical disc. A channel bit rate, which is the rate at which data is read from a disc, is typically 4.3218 Mbps. Different types of CDs include CD-audio (or CD-DA) on which audio data is recorded, CD-ROM on which data or a video signals are stored, CD-I on which multimedia information are interactively recorded, and video CD.

An optical disc player for reproducing information stored on the above optical discs typically comprises a plurality of hardware components including, for example, an analog signal processing unit, a servo unit, a digital signal processing unit, and an output unit. An analog signal extracted from the optical disc is amplified and processed by the analog signal processing unit to remove noise. Further, demodulation, de-interleaving and error-correction are performed on the analog signal in the digital signal processing unit. The audio data is then transmitted to the output unit for playback to the user. More specifically, the output unit decodes the CD-ROM and converts a digital signal to an analog signal. The servo unit controls the position on the optical disc from which signals are extracted.

In conventional systems, the data output from the digital signal processing unit is serially transmitted to the output unit. With respect to such serial data transmission, the digital signal processing unit is the master and the output unit is the slave. As such, the audio data is unilaterally transmitted to the output unit. One problem associated with this configuration is the lack of a mechanism for controlling the memory of the output unit, which results in a high probability that an error will occur. Thus, a system and method that would reduce such data error is highly desirable.

SUMMARY OF THE INVENTION

The present invention is directed to an apparatus and method for controlling the output of digitally processed data in an optical disc player so as to reduce the probability of error and lost data during such output.

In one aspect of the invention, an apparatus for processing information on an optical disc comprises a signal processor for processing a digital signal corresponding to an analog signal read from the optical disc to generate output data, a memory unit, operatively associated with the signal processor, for temporarily storing the output data in predetermined units under the control of the signal processor, and an output unit, operatively connected to the signal processor, for processing the output data based on the type of optical disc. The output unit generates a request signal that causes the signal processor to retrieve output data from the memory unit and transmit the retrieved output data to the output unit in parallel. The signal processor activates an acknowledge signal such that output data transmitted to the output unit while the acknowledge signal is activated is deemed valid by the output unit.

In another aspect, the output data comprises demodulated data and corresponding error-corrected data, and the memory unit preferably comprises a first memory region for storing the demodulated data, a second memory region for storing the error-corrected data, and a third memory region for receiving the error-corrected data and storing the data in predetermined blocks. The data stored in the third memory region comprises the output data that is transmitted in parallel by the signal processor to the output unit.

In yet another aspect of the invention, an apparatus for processing information on an optical disc comprises a first signal processor for receiving a digital signal generated from an analog signal read from the optical disc, performing demodulation and error-correction with respect to the received digital signal to generate main data and corresponding subcode data for output, a memory unit for temporarily storing the main data and corresponding subcode data in predetermined units, a second signal processor for reading the main data and corresponding subcode data from the memory unit and outputting the main data and corresponding subcode data in parallel together with an acknowledge signal, in response to a predetermined request signal, and an output unit for outputting the request signal to the second signal processor and receiving in response thereto the main data and corresponding subcode data in parallel and the acknowledgment signal so as to process the main data based on the subcode data.

Preferably, the memory unit comprises a first memory region for storing demodulated data, a second memory region for storing error-corrected demodulated data, and a third memory region for temporarily storing the error-corrected demodulated data in predetermined units. The error-corrected demodulated data stored in the third memory region comprises the main data and corresponding subcode data that are output in parallel by the second signal processor.

In another aspect of the present invention, an optical disc player comprises an analog signal processor for processing an analog signal extracted from an optical disc to generate preliminary signal processed data, a digital signal processor for processing the preliminary signal processed data to generate digital signal processed data, storing the digital signal processed data in memory, retrieving the digital signal processed data from memory in response to a request signal, generating an acknowledge signal, and outputting the digital signal processed data in parallel together with the acknowledge signal, and an output unit for outputting the request signal to the digital signal processor, receiving the digital signal processed data in parallel, decoding the digital signal processed data based on the type of optical disc and outputting the decoded data to terminal equipment.

Preferably, the digital signal processor comprises a first memory region for storing demodulated data generated by the digital signal processor from demodulating the preliminary signal processed data, a second memory region for storing error-corrected data generated by the digital signal processor from error-correcting the demodulated data and a third memory region for receiving the error-corrected data and storing the data in predetermined block units. The data stored in the third memory region comprises the digital signal processed data that is output in parallel to the output unit.

In yet another aspect of the invention, a method for processing information on an optical disc comprises the steps of processing an analog signal extracted from an optical disc to generate preliminary signal processed data, digital signal processing the preliminary signal processed data to generate digital signal processed data, generating a first control signal to output the digital signal processed data, and generating a second control signal and outputting the digital signal processed data in parallel together with the second control signal, in response to the first control signal. Digital signal processed data that is output during a period in which the second control signal is not activated is deemed invalid output data.

These and other aspects, features, and advantages of the present invention will become apparent from the following detailed description of the preferred embodiments, which is to be read in connection with the accompanying drawings.

BRIEF DESCRIPTION OF THE DRAWINGS

FIG. 8 illustrates the format of data of a CD-ROM.

DETAILED DESCRIPTION OF PREFERRED EMBODIMENTS

Figure 1:
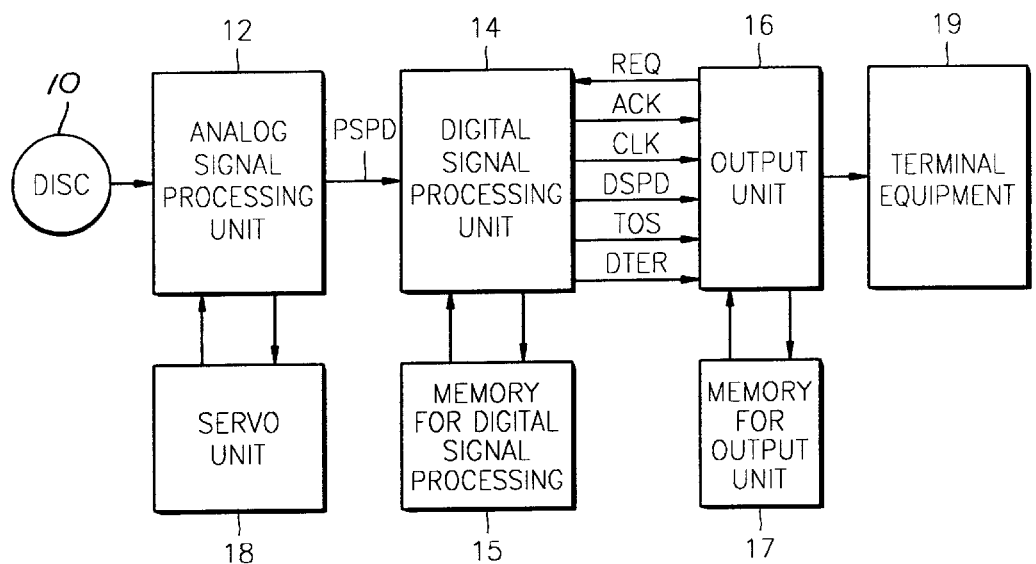
FIG. 1 is a block diagram of an optical disc player according to a preferred embodiment of the present invention.

FIG. 1 is a block diagram of an optical disc player according to a preferred embodiment of the present invention. The optical disc player comprises an analog signal processing unit 12, a servo unit 18, a digital signal processing unit 14 and memory device 15 associated therewith, and an output unit 16 and memory device 17 associated therewith. The optical disc player is connected to terminal equipment 19 (e.g., a speaker, monitor, computer, etc.).

The analog signal processing unit 12 amplifies an analog signal extracted from an optical disc 10, removes noise from the analog signal, and then outputs the analog signal as preliminary signal processed data (PSPD). The servo unit 18 controls the exact position of the signal to be extracted from the disc 10. The digital signal processing unit 14 receives the preliminary signal processed data (PSPD) and performs digital signal processing such as demodulation, de-interleaving, and error correction. After such processing, the processed data is output as digital signal processed data (DSPD).

Figure 6:
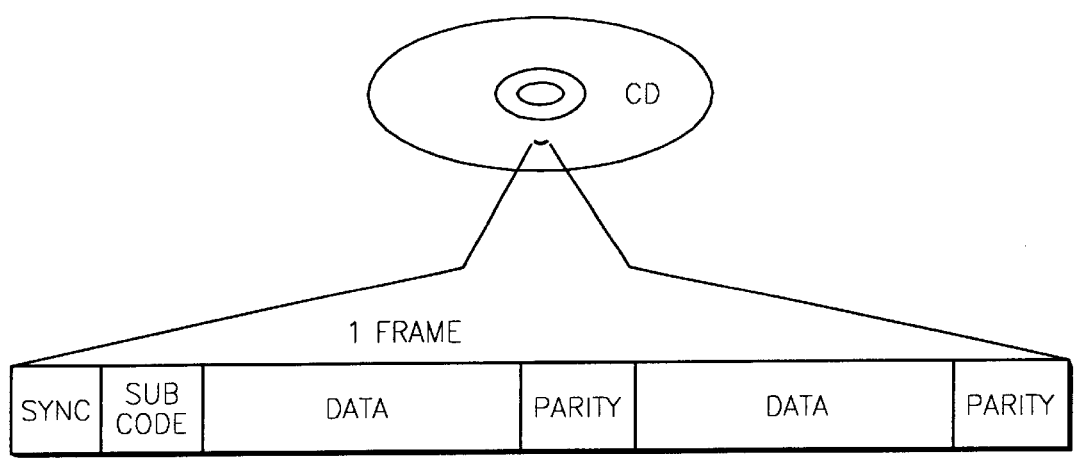
FIG. 6 illustrates the structure of frame data prior to EFM (eight-to-fourteen modulation) in a compact disc (CD)

Typically, in a compact disc (CD), data is modulated using EFM (eight-to-fourteen modulation) and recorded in the form of pits, and an optical pickup is used to reproduce the data in a player. Blocks of channel bit data that are to be coded and recorded on a disc are first coded into frames using CIRC error-correction coding and then modulated using EFM. More specifically, data on the CD is formatted by frame (i.e., frame encoding), whereby a frame is the smallest unit of recognizable data on the disc comprising classified audio data, its parity, the synchronizing word, and the subcode. The frame structure before EFM is illustrated in FIG. 6. Each frame comprises audio data that is encoded using CIRC and combined with 64 CIRC parity bits (8 parity words, each comprising 8 bits), a subcode comprising 8 subcode bits (P, Q, R, S, T, U, V, W) and 24 synchronization (SYNC) bits, resulting in a 288-bit frame. Each 288-bit frame is modulated into 588 channel bits using EFM. During EFM modulation, EFM code is modulated to NRZ code and the NRZ is converted to NRZI.

The disc player reproduces data on the disc 10 by performing demodulation, error-correction, filtering, and digital-to-analog conversion. In the optical pickup, a radio frequency (RF) signal is detected from the disc 10, amplified, and then "eye" patterns are obtained. The NRZI demodulated "eye" patterns are converted to square waveforms or rectangular waveforms and then converted to a NRZ signal. The synchronizing word is separated from an EFM signal and used in data synchronizing, and an EFM code comprising a 14-bit EFM word is converted to 8-bit data. Likewise, synchronization, subcode, audio signal, and error-correction data are reproduced by demodulating the RF signal.

After the demodulation process, error-detection and correction are performed, wherein a combination of two Reed-Solomon decoders C1 and C2 are used in CIRC error-correction decoding. The C1 decoder corrects small errors and errors which are not corrected by a flag, and the C2 decoder corrects larger errors by an error flag. If the CIRC decoders cannot correct all errors, the non-error-corrected data is marked with an eraser flag and reconstructed using linear interpolation.

The digital signal processing unit 14 comprises (or utilizes) a memory device 15 to store data generated during digital signal processing. The memory device 15 may reside within the chip that houses the digital signal processing unit 14 or the memory device 15 may comprise external memory. In a preferred embodiment, the memory device 15 for the digital signal processing is an external memory unit.

Figure 2:
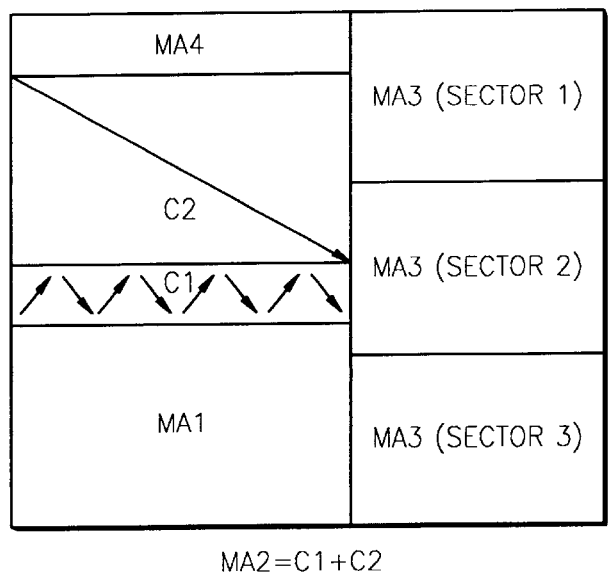
FIG. 2 is a diagram of a memory format according to one aspect of the invention for digital signal processing in the optical disc player of FIG. 1.

Referring to FIG. 2, the memory for digital signal processing 15 is preferably divided into four memory regions MA1, MA2, MA3 and MA4. The assignment of the four memory regions MA1–MA4 may be a fixed assignment or a variable assignment.

The demodulated data comprising the PSPD is stored in the first memory region MA1. In general, as noted above, the EFM protocol is typically used as a demodulation method for storing data in the optical disc. EFM is modulation which converts an 8-bit signal into a 14-bit signal. Preferably, the EFM demodulated data is stored in the first memory region MA1.

The second memory region MA2 is a memory region that is used for the processes of de-interleaving and error-correcting the EFM demodulated data. In a preferred embodiment, de-interleaving and error-correction are performed twice, respectively. As shown in FIG. 2, the second memory region MA2 is divided into a first de-interleaving and error-correction region C1 and a second de-interleaving and error-correction region C2. The direction of an arrow in the second memory region MA2 denotes a direction in which each data is read (i.e., adjacent data is not read sequentially but data is read in a predetermined pattern, and then de-interleaving of such data is performed).

The third memory region MA3 comprises a plurality of memory regions in which the DSPD is temporarily stored by a predetermined block before being output. Each memory region preferably comprises a sector. One sector comprises a predetermined number of frames. As noted above, with an audio CD, each frame comprises 24 bytes of main data and 1 byte of subcode data (as well as 8 bytes of parity data and 3 bytes of synchronizing data). The main data is information data, and the subcode data is control data. One subcode format comprises 98 successive frames. Thus, preferably, the third memory MA3 also comprises 98 frames as one sector. Preferably, the third memory region MA3 includes at least two sector regions having a region for storing the data of one sector output to the output unit 16 and a region for storing the error-corrected data of one sector while the data is transmitted to the output unit 16. Meanwhile, the situation where data is not normally read (because of a shock imparted to a pickup unit) can be prepared for by increasing the capacity of the memory regions.

The fourth memory region MA4 functions as a buffer between the second memory region MA2 and the third memory region MA3. Thus, the data in the second memory region MA2 is temporarily stored in the fourth memory region MA4 and transmitted to the third memory region MA3. The data in the third memory region MA3 is transmitted in parallel, according to a request signal REQ generated by the output unit 16.

In response to the request signal REQ transmitted from the output unit 16, the digital signal processing unit 14 outputs an acknowledgment signal ACK and the DSPD. The DSPD is synchronized with a predetermined clock CLK and output in parallel. Preferably, the DSPD is transmitted in bytes (8-bit).

Figure 3:
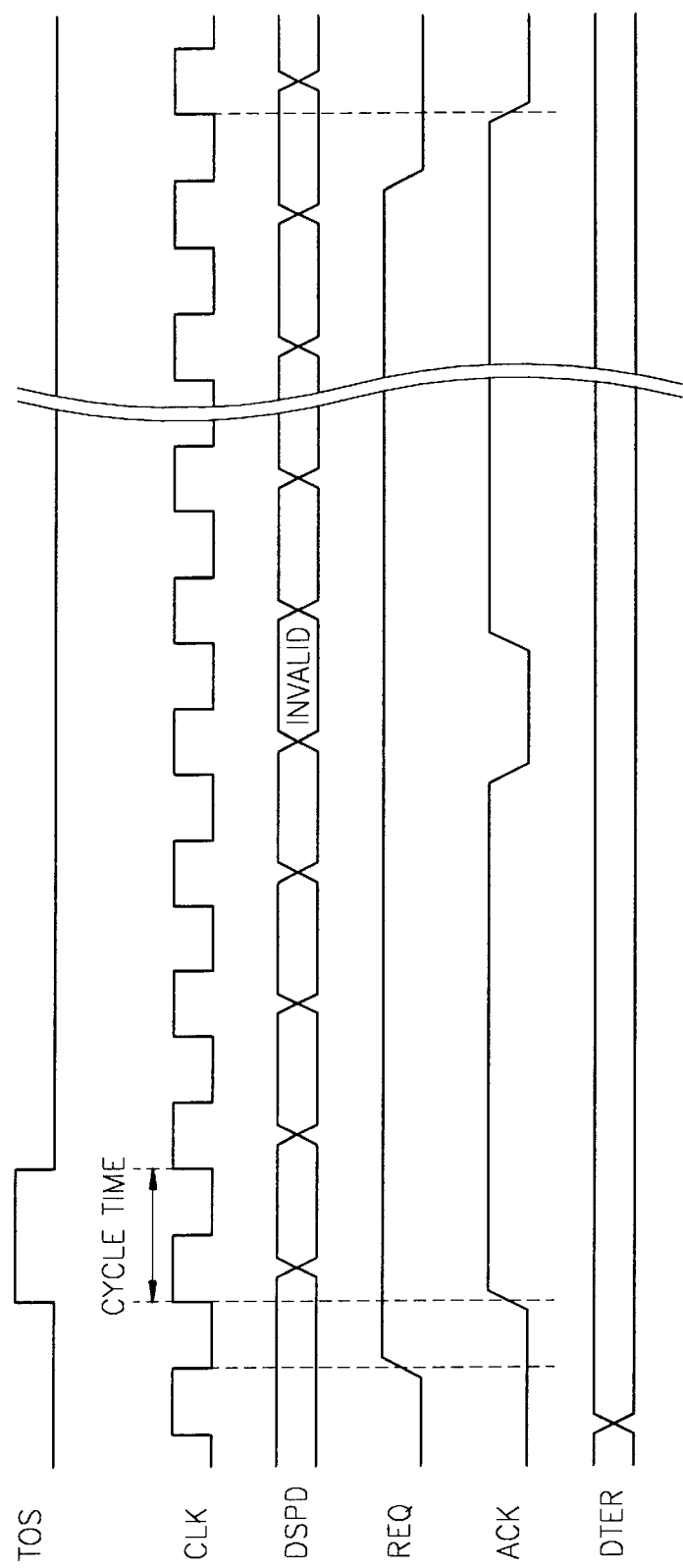
FIG. 3 is a timing diagram illustrating control signals according to one aspect of the present invention which are preferably implemented in the optical disc player of FIG. 1.

A data transmission operation between the digital signal processing unit 14 and the output unit 16 in the optical disc player of FIG. 1 will now be described with reference to FIG. 3. FIG. 3 comprises a timing diagram of the signals transmitted between the digital signal processor unit 14 and the output unit 16. A TOS (top of sector) signal indicates the start of each sector when several sectors of data are transmitted. As noted above, the DSPD signal denotes digital signal processed data output from the digital signal processing unit 14, the REQ is a signal by which the output unit 16 requests the digital signal processing unit 14 to transmit the data, and ACK is an acknowledgment signal by which the digital signal processing unit 14 acknowledges the normal transmission of data to the output unit 16. DTER is a signal for indicating a data error by sector.

The request signal REQ is activated and output by the output unit 16 to request the transmission of the DSPD. As shown in FIG. 3, an activated request signal REQ comprises a "high" logic level (i.e., logic "1"). When the digital signal processing unit 14 receives the activated request signal REQ, the unit 14 will transmit the DSPD and the acknowledgment signal ACK based on a clock CLK signal. In a preferred embodiment, the DSPD is transmitted at a rising edge of a clock CLK pulse, and the output unit 16 receives the DSPD at a falling edge of a clock CLK pulse. When the digital signal processing unit 14 sends a normal DSPD, an activated acknowledgment signal ACK (i.e., having a logic level of "1") is transmitted to the output unit 16. When the acknowledgment signal ACK is deactivated (deasserted to logic level "0"), the DSPD in a corresponding clock CLK is deemed "invalid" data. Preferably, the request signal REQ and the acknowledgment signal ACK are activated by sector.

The signal for indicating the start of a sector TOS and the signal for indicating a sector error DTER may be further used. The TOS signal is activated for a predetermined time at a first portion of a transmitted sector. The DTER is a signal for indicating whether there is a data error in the corresponding sector.

The output unit 16 receives and processes the DSPD to reproduce the information on the DISC and outputs such data to the terminal equipment 19. The processing steps for reproducing the information of the DISC by the output unit 16 may differ based on the type of DISC. In the case of an audio CD, the output unit 16 performs processing such as digital-to-analog conversion and amplification of data. In the case of a CD-ROM, the output unit 16 performs decoding according to a CD-ROM format. When the information on the DISC is image data, the output unit 16 must perform decoding (generally MPEG decoding) for expanding the compressed image data. As noted above, the terminal equipment 19 may comprise a speaker, a monitor, and a computer.

The output unit 16 decodes the DSPD output from the digital signal processing unit 14. In conventional methods wherein data transmission from the digital signal processing unit 14 to the output unit 16 is unilaterally performed by a master/slave method, if the state of a memory for decoding is busy, the loss of data can occur. Advantageously, according to a preferred embodiment of the present invention, data is transmitted by byte using a request/acknowledgment method when transmitting CD data so that the problem in transmission can be solved, and the loads for controlling the memory for decoding can be reduced.

Figure 4:
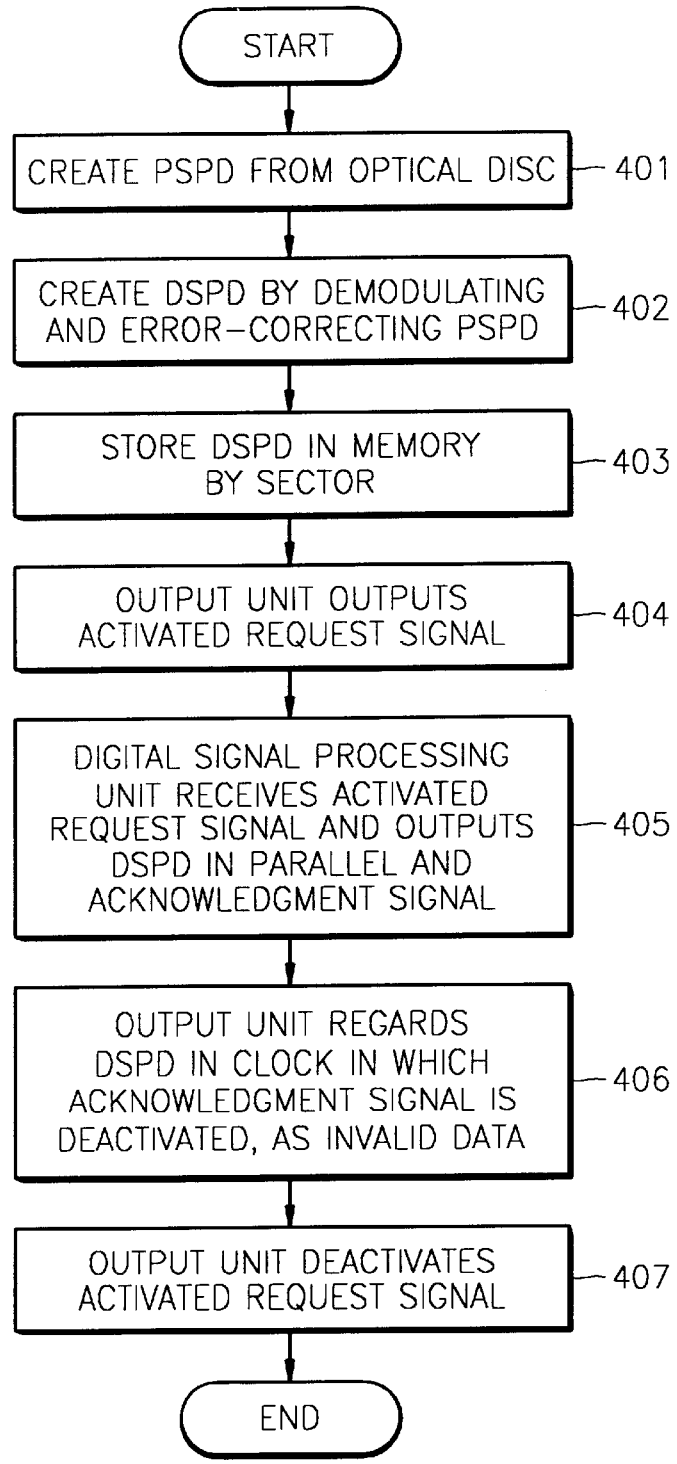
FIG. 4 is a flow diagram of a method for processing information on an optical disc according to one aspect of the invention.

FIG. 4 is a flow diagram of a method for transmitting the DSPD between the digital signal processing unit 14 and the output unit 16 in the optical disc player of FIG. 1, according to one aspect of the present invention. The PSPD is generated from a signal which is read from the DISC (step 401). The digital signal processing unit 14 generates the DSPD by demodulating and error-correcting the PSPD (step 402). The DSPD is stored in a memory by sector (step 403). The output unit 16 outputs an activated request signal (REQ) when the output unit 16 is ready to receive the DSPD from the digital signal processing unit 14 (step 404). The digital signal processing unit 14 receives the activated request signal REQ and reads the DSPD from the memory and outputs the DSPD in parallel and the acknowledgment signal (ACK) to the output unit 16 (step 405). Any DSPD that is received in synchronization with a clock pulse in which the acknowledgment signal (ACK) is deactivated, will be deemed as "invalid" data (step 406). When all the DSPD are received, the output unit 16 deactivates the activated request signal (REQ) (step 407).

The process of reproducing subcode information is performed after error-correction is performed in the digital signal processing unit 14 of FIG. 1. As noted above, during encoding of data, 8-bits of subcode information per frame are contained in a bit stream. During decoding, subcode data is read from a block of 98-frames and the subcode data extracted from the 98 frames is pooled to make up a subcode block.

As noted above, each CD frame comprises an 8-bit subcode having information that indicates, e.g., the start and end points of a track, a track number, an index pointer, etc. During the reproduction of data, subcode bits properly interpret information on the disc and are processed so that a user may adjust the player when accessing the contents of the disc.

Figure 7:
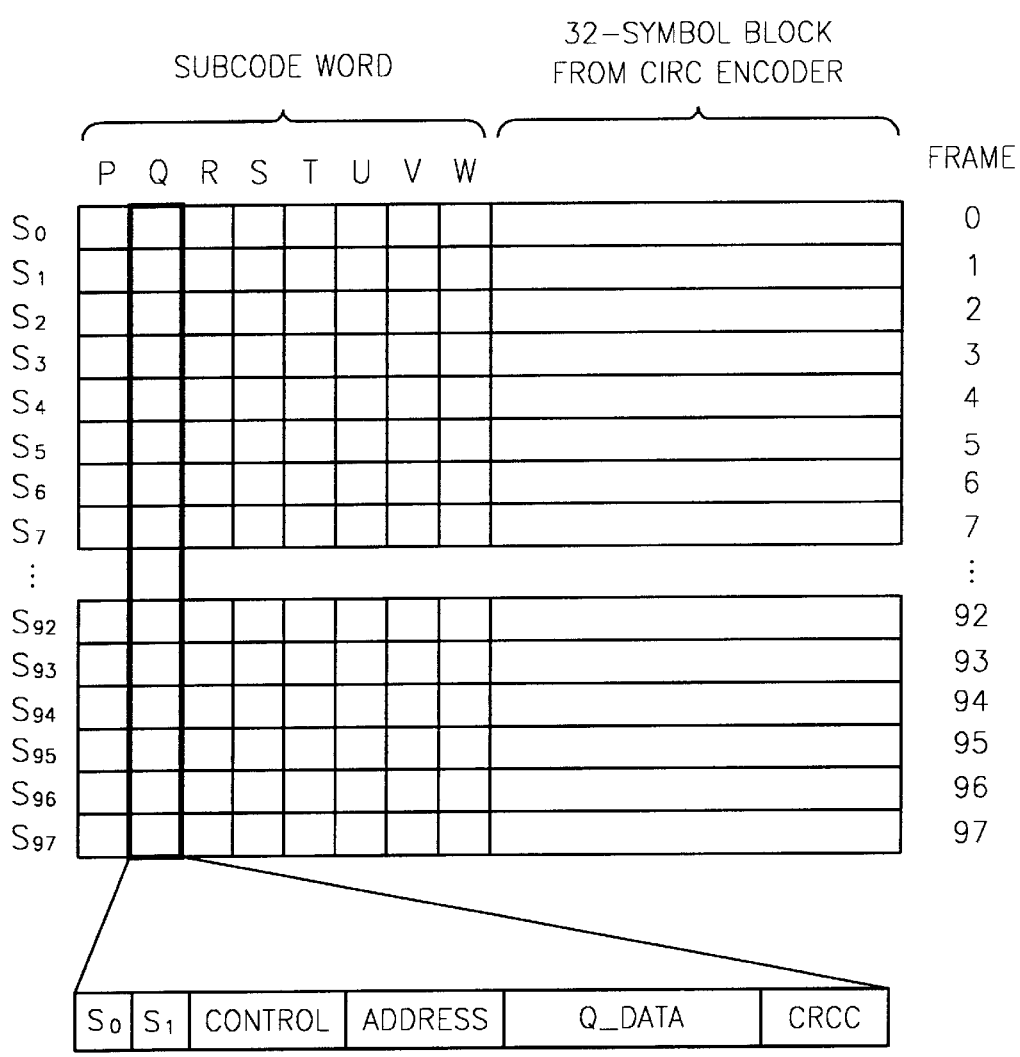
FIG. 7 illustrates the structure of data of a CD subcode block.

FIG. 7 is a diagram that illustrates the data structure of a CD subcode block. Each of the 8-bits of subcode are indicated as P, Q, R, S, T, U, V, and W. The P and Q subcode bits specify certain parameters associated with an audio format (such as the number of tracks on the CD and their beginning and ending point or times, etc.) and are irrelevant to CIRC error-correction coding. Each subcode block comprises 98 frames and begins at synchronizing patterns $S_0$ and $S_1$ in a first symbol position. The P channel comprises a flag bit that denotes lead-in and lead-out regions of the disc and the start of the track. The Q channel specifies four types of information such as a control, address, Q data, and an error-correction code. The other bits R, S, T, U, V, and W are recorded as 0 in most CDs.

FIG. 8 illustrates a data format for a CD-ROM. As shown in FIG. 8, the data format is extensible to be widely applied in storing general information. The CD-ROM format has been used in a medium for storing an audio signal and a program for use in a computer. Although CD-ROM standards have originated from CD-audio standards, their data format is directed to storing general data.

One block includes 2352 bytes (24 bytes×98 frames). A 60-minute disc has 283,500 blocks, and the first 12-bytes of one block form synchronizing patterns, and the next 4-bytes form a header field for a time and address flag, and the other 2336 bytes store user data and data for error-correction. A header comprises three address bytes and one mode byte, and time information such as the number of blocks per hour, per minute, and per second are stored in each byte of the address, respectively. The CD-ROM specification is divided into two modes, Mode 1 and Mode 2, depending on the structure of data blocks. In Mode 1, extended error-detection and correction are performed whereas in Mode 2, additional user data is stored. A CD-ROM/XA data format is based on the format in Mode 2 of the CD-ROM, and the CD-ROM/XA data format includes a form for performing extended error-detection and correction (Form 1) and a format for increasing the capacity of storing user data (Form 2).

Figure 5:
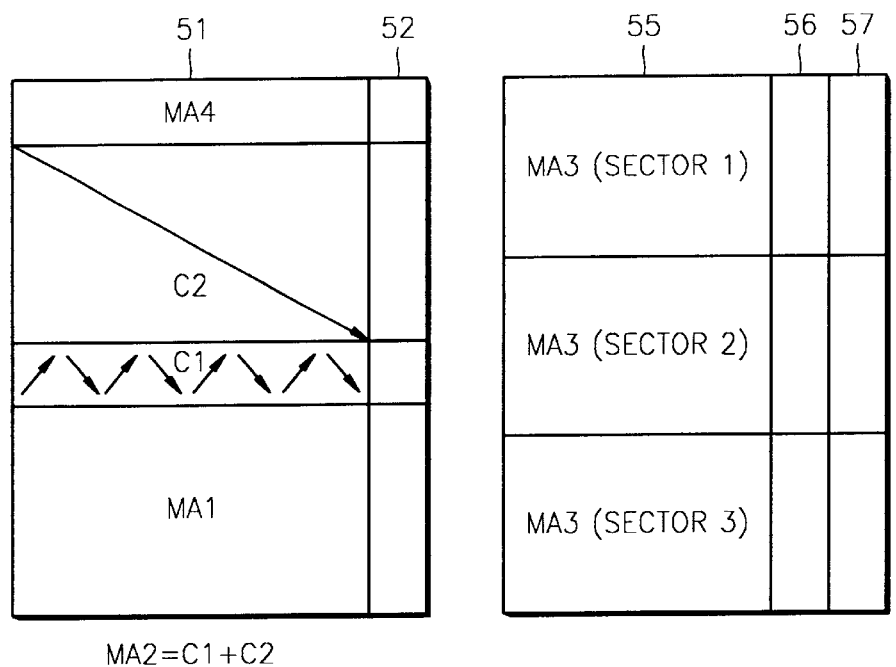
FIG. 5 is a diagram of a memory format according to another aspect of the invention for digital signal processing in the optical disc player of FIG. 1.

FIG. 5 is a diagram that illustrates a memory mapping of the memory unit 15 according to the invention. In accordance with the invention, CD main data, and the associated subcode data and error-correction (ECC) parity data are stored in the memory 15, and such data is transmitted to the output unit 16 according to a request/acknowledgment method as described above. The digital signal processing unit 14 transmits the subcode data and the ECC parity data to the output unit 16 by using the same port as the main data using a time-division method. Alternatively, a port for the subcode data and the ECC parity data can be added to the digital signal processing unit 14 such that the port for transmitting the subcode data and the ECC parity data can be separate from the port for transmitting the main data.

Referring to FIG. 5, EFM data (main data) 51 is preferably written in a horizontal direction in the first memory region MA1, and 1-byte of subcode data 52 at the end of 1 frame is written in the first memory region MA1. The second memory region MA2 is a memory for C1/C2 error-correction. A correction flag generated during error-correction is stored in a flag memory (such as a register or SRAM memory, not shown). Before transmission of main data 51 whose error-correction is completed, the main data 51 and the corresponding subcode data 52 (stored in the first memory region MA1) are temporarily stored in the fourth memory region MA4. Then, main data 55 and corresponding subcode data 56 are received from the fourth memory region MA4 and a correction flag 57 is received from the flag memory, and this data is then stored to constitute a data map by sector in the third memory region MA3. The data stored by sector in the third memory region MA3 is transmitted in parallel in bytes to the output unit 16 using the request/acknowledgment (Req/Ack) method described above.

As described above, the data format of the CD-ROM is similar to that of a CD-audio. The CD-audio can be reproduced by a CD-ROM driver, but the CD-ROM cannot be reproduced by a CD-audio driver. Digital-to-analog conversion, output filtering and an audio output port are unnecessary in the CD-ROM driver, but a computer for an interface and output is required. Further, MPEG-1 coding standards for audio and video are used in the format of a video-CD, which is the same as Form 1 of Mode 2 of a CD-ROM/XA bridge disk from the viewpoint of disc standards. Thus, the video-CD can be reproduced in the CD-ROM or CD-I driver, but the video-CD cannot be reproduced by a CD-audio player.

The output unit 16 receives the DSPD and performs decoding based on the type of the CD and outputs data to the terminal equipment 19. In the case of an audio-CD, the output unit 16 converts digital data to analog data and amplifies the data. In the case of a CD-ROM, the output unit 16 performs decoding based on the CD-ROM format. In the case of a video-CD, the output unit 16 performs decoding to expand the compressed image data.

The above methods according to the present invention can be embodied as computer (including all devices having the function of data processing) readable codes on computer readable media. The computer readable media comprises all type of recording devices in which computer readable data are stored. The media can include ROM, RAM, CD-ROM, magnetic tape, floppy disks, and other storage devices. Also, the media can be carrier waves such as those transmitted through the Internet. Also, the computer readable media can be distributed over a plurality of computer systems on a network, and the computer readable codes can be stored and executed using dispersion methods known in the art.

Advantageously, an optical disc player having an architecture as described herein utilizing parallel transmission of processed data from the digital signal processing unit to the output unit using the REQ/ACK signal (as opposed to unilateral serial transmission), can reduce the probability of error. For instance, in a video CD player, the output unit is embodied in a MPEG chip employing a CD-ROM decoder. When the parallel transmission method of the present invention is used in this case, the MPEG chip can receive the digital signal processed data of the video CD using only a parallel port. While the memory of the MPEG chip is controlled, the digital signal processed data is not received, and when the memory of the MPEG chip is ready to receive the digital signal processed data, the digital signal processed data can be received. Thus, the load due to the control of the memory of the MPEG chip can be reduced.

While this invention has been particularly shown and described with reference to preferred embodiments thereof, it will be understood by those skilled in the art that various changes in form and details may be made thereto without departing from the spirit and scope of the invention as defined by the appended claims.

What is claimed is:

1. An apparatus for processing information on an optical disc, comprising:

a signal processor for processing a digital signal corresponding to an analog signal read from the optical disc to generate output data;

a memory unit, operatively associated with the signal processor, for temporarily storing the output data in predetermined units under the control of the signal processor; and an output unit, operatively connected to the signal processor, for processing the output data based on the type of optical disc, wherein the output unit generates a request signal that causes the signal processor to retrieve output data from the memory unit and transmit the retrieved output data to the output unit in parallel, and wherein the signal processor activates an acknowledge signal such that output data transmitted to the output unit while the acknowledge signal is activated is deemed valid by the output unit.

2. The apparatus of claim 1, wherein the output data comprises demodulated data and corresponding error-corrected data, and wherein the memory unit comprises:

a first memory region for storing the demodulated data;

a second memory region for storing the error-corrected data; and a third memory region for receiving the error-corrected data and storing the data in predetermined blocks; wherein the data stored in the third memory region comprises the output data that is transmitted in parallel by the signal processor to the output unit.

3. An apparatus for processing information on an optical disc, comprising:

a first signal processor for receiving a digital signal generated from an analog signal read from the optical disc, performing demodulation and error-correction with respect to the received digital signal to generate main data and corresponding subcode data for output;

a memory unit for temporarily storing the main data and corresponding subcode data in predetermined blocks;

a second signal processor for reading the main data and corresponding subcode data from the memory unit and outputting the main data and corresponding subcode data in parallel together with an acknowledge signal, in response to a predetermined request signal; and an output unit for outputting the request signal to the second signal processor and receiving in response thereto the main data, corresponding subcode data, and acknowledgment signal in parallel so as to process the main data based on the subcode data.

4. The apparatus of claim 3, wherein the memory unit comprises:

a first memory region for storing demodulated data;

a second memory region for storing error-corrected demodulated data; and a third memory region for temporarily storing the error-corrected demodulated data in predetermined blocks; wherein the error-corrected demodulated data stored in the third memory region comprises the main data and corresponding subcode data that are output in parallel by the second signal processor.

5. The apparatus of claim 4, wherein the memory unit further comprises a flag memory region for storing corrected flag data produced during error-correction, wherein the corrected flag data is temporarily stored in the third memory region and output together with the main data and corresponding subcode data in parallel by the signal processing unit.

6. An optical disc player, comprising:

an analog signal processor for processing an analog signal extracted from an optical disc to generate preliminary signal processed data;

a digital signal processor for processing the preliminary signal processed data to generate digital signal processed data, storing the digital signal processed data in memory, retrieving the digital signal processed data from memory in response to a request signal, generating an acknowledge signal, and outputting the digital signal processed data in parallel together with the acknowledge signal; and an output unit for outputting the request signal to the digital signal processor, receiving the digital signal processed data in parallel, decoding the digital signal processed data based on the type of optical disc and outputting the decoded data to terminal equipment.

7. The optical disc player of claim 6, wherein the digital signal processor comprises:

a first memory region for storing demodulated data generated by the digital signal processor from demodulating the preliminary signal processed data;

a second memory region for storing error-corrected data generated by the digital signal processor from error-correcting the demodulated data; and a third memory region for receiving the error-corrected data and storing the data in predetermined blocks; wherein the data stored in the third memory region comprises the digital signal processed data that is output in parallel to the output unit.

8. The optical disc player of claim 6, wherein the data output from the digital signal processor comprises main data and corresponding subcode data, which are generated from the digital signal processed data, and corrected flag data generated by error-correction of the main data.

9. A method for processing information on an optical disc, comprising the steps of:

processing an analog signal extracted from an optical disc to generate preliminary signal processed data;

digital signal processing the preliminary signal processed data to generate digital signal processed data;

generating a first control signal to output the digital signal processed data; and generating a second control signal and outputting the digital signal processed data in parallel together with the second control signal, in response to the first control signal.

10. The method of claim 9, further comprising the step of processing the digital signal processed data output in parallel based on the disc type.

11. The method of claim 9, wherein digital signal processed data that is output during a period in which the second control signal is not activated is deemed invalid output data.

12. The method of claim 9, wherein the data output in parallel comprises main data for output, subcode data corresponding to the main data which is generated from the digital signal processed data, and corrected flag data produced by error-correction of the main data.

13. A program storage device readable by a machine, tangibly embodying a program of instructions executable by the machine to perform method steps for processing information on an optical disc, the method steps comprising:

processing an analog signal extracted from an optical disc to generate preliminary signal processed data;

digital signal processing the preliminary signal processed data to generate digital signal processed data;

generating a first control signal to output the digital signal processed data; and generating a second control signal and outputting the digital signal processed data in parallel together with the second control signal, in response to the first control signal.

14. The program storage device of claim 13, further comprising instructions for performing the step of processing the digital signal processed data output in parallel based on the disc type.

15. The program storage device of claim 13, wherein digital signal processed data that is output during a period in which the second control signal is not activated is deemed invalid output data.

16. The program storage device of claim 13, wherein the data output in parallel comprises main data for output, subcode data corresponding to the main data which is generated from the digital signal processed data, and corrected flag data produced by error-correction of the main data.

* * * * *